(No Model.)

R. L. NELSON.
PERCOLATOR.

No. 340,811. Patented Apr. 27, 1886.

Witnesses:
B. C. Fenwick
Wm. L. Allan

Inventor:
Richard L. Nelson
By his Attorney
Chas. J. Gooch

UNITED STATES PATENT OFFICE.

RICHARD L. NELSON, OF ORANGE COUNTY, VIRGINIA.

PERCOLATOR.

SPECIFICATION forming part of Letters Patent No. 340,811, dated April 27, 1886.

Application filed October 17, 1885. Serial No. 180,189. (No model.)

*To all whom it may concern:*

Be it known that I, RICHARD L. NELSON, a citizen of the United States of America, residing in the county of Orange and State of Virginia, have invented certain new and useful Improvements in Percolators; and I do hereby declare the following to be a full, clear, and exact description of the invention, such as will enable those skilled in the art to which it appertains to make and use the same, reference being had to the accompanying drawings, and to letters or figures of reference marked thereon, which form a part of this specification.

This invention relates to that class of percolators constructed separately for coffee and tea pots and adapted to be employed in connection with ordinary-shaped pots and other vessels, such as pitchers, mugs, and the like.

The invention consists, essentially, in forming the percolator with double walls, so as to provide a circumferential space to contain hot water, for the purpose of maintaining the temperature of the water to be impregnated with the tea or coffee; in forming slits or openings in the upper portion of the inner wall, to permit of the ready flow of water to the surrounding jacket or hot-water space; in providing the bottom of the percolator with a suitable strainer; in providing the inner compartment with a removable strainer adapted to fit and rest within the same, and in a cap or cover having a knob or handle having an air-passage, all as hereinafter described.

Figure 1:
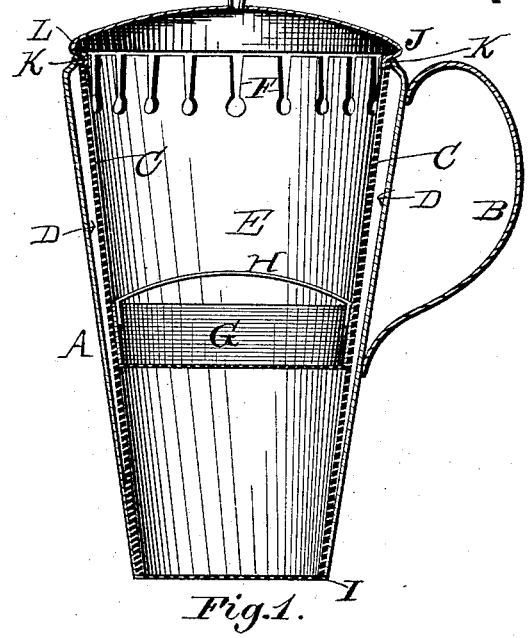
Figure 2:
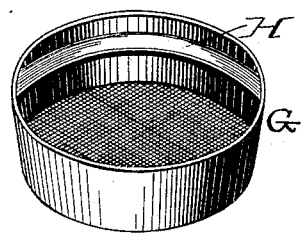

In the accompanying drawings, Figure 1 represents a vertical section of a percolator constructed according to my invention. Fig. 2 represents a detail view of the separable strainer.

A represents the outer wall of my improved percolator, which is of conical shape, to adapt it to be readily inserted in the top opening of a coffee or tea pot, pitcher, or other vessel in which it is desired that the infusion of tea or coffee, as the case may be, shall flow.

B represents the handle by which the percolator may be grasped, carried, and placed in position.

C represents a wall or lining, also of tapering or conical form, and of corresponding or nearly corresponding shape circumferentially to the circumferential shape of the outer portion of the percolator. This inner wall or lining is at its lower end soldered or otherwise connected to the inner face of the outer wall, A, so as to form a tight joint therewith, and it is of such less circumference than the outer member as to leave a space or jacket, D, surrounding the chamber E and between it and the outer member, A, of the percolator, within which hot water may be contained, for the purpose of maintaining the heat of the water used in making the infusion. By forming a tight connection between the walls of the inner and outer chambers all access of the water contained within the hot-water jacket with the infusion is prevented.

F represents slots of holes formed in the upper portion of the material forming the inner or percolating chamber, so that as the hot water is poured in said infusing or percolating chamber the same will overflow therefrom to and fill the water-jacket D between said chamber and the outer wall. When the infusion has been made, all that is necessary to empty the water-jacket is to simply turn the percolator bottom upward, whereupon the water will flow out of the jacket.

G represents a cup-shaped strainer of taper form, to adapt it to fit snugly and tightly within the inner or infusing chamber. The coffee or tea is placed within the inner chamber and upon the bottom thereof. The cup-shaped strainer is then placed in position, and the water poured within the chamber until it and the surrounding jacket are filled. Then the lid is placed on the percolator. The water will then gradually and in minute drops flow down through the cup-shaped water-strainer upon the material beneath. By this means there will be no body of water resting upon the material, which will thus remain in a compact mass at the bottom of the chamber, and will not float up. By placing the basket-strainer in the position shown, the water, as it percolates therethrough, will drop gradually upon the coffee-meal, and without agitating it extract the entire strength of the coffee. Where coffee is placed in a pot and water poured directly thereon or allowed to fall thereon in streams, not only does the coffee-meal float up and swell, but the bulk of the water, by reason of its greater weight, falls below the bulk of the ground coffee and passes therefrom without perfectly extracting its strength. By reason of the cup-shaped strainer resting snugly and tightly against the inner walls of the inner or infusing or percolating chamber, no water can pass down into the vessel designed to receive the infusion without first passing entirely and slowly through the material placed below the cup-shaped strainer.

H represents a handle or bail connected to or formed integrally with the cup-strainer G, to facilitate its being placed in and removed from position.

I represents a strainer in the bottom of the percolator. This strainer is also of fine mesh, and upon it the coffee rests, and through which the water, as it percolates through the coffee, passes.

J represents the cap or cover. This is formed with a downwardly-extending flange or rim, K, which passes down inside the walls and closes the openings into the water-jacket of the percolating-chamber, and with a curved rim or flange, L, which, when the cover is in position, covers and incloses the upper end of the inner chamber and partially overlies the water-jacket.

M represents a lifting-knob on the cover J, said knob being formed hollow, to admit sufficient air to supply the vacuum created in the percolating-chamber by the flow therefrom of the water.

A double-walled percolator, such as here shown and described by me, may be made of any desired metal or material, or alloy of metal, or combinations of metal and other material—such, for instance, as partly of metal and partly of delf or other china or pottery ware—and it may be so cast or molded as to form the inner chamber and outer member in one piece, if desired.

My percolator is adapted, by reason of its taper shape, for use with pots or mugs of any shape, no special construction thereof being necessary. By it one can boil and drip at one and the same time by placing it and the vessel to contain the percolated liquid over or near a fire.

By forming the percolator with a water-jacket the water within the inner chamber will remain hot all the time it is percolating through the coffee, and thus hot coffee can be made, even in cold weather, on a table or other place away from the fire—a great advantage in many cases.

Having thus described my invention, what I claim is—

1. A percolator having a strainer-bottom, an inner compartment, and a surrounding water-jacket, the inner compartment having at its upper part connection with said surrounding water-jacket, substantially as set forth.

2. A percolator having a strainer-bottom, a surrounding water-jacket, a central compartment having at its upper portion communication with said water-jacket, and a strainer adapted to fit within said central compartment, for the purpose of confining the material to be percolated and permitting of the gradual supply of water thereto, substantially as set forth.

3. A percolator of conical or taper form, having a surrounding water-jacket and a strainer-bottom, a central compartment to receive the material to be treated and the water to be percolated therethrough, and having at its upper portion connection with said water-jacket, and a water-strainer adapted to fit within said inner compartment for the purpose of confining the coffee or other material at the bottom and permitting of the gradual flow of the water thereto, substantially as set forth.

In testimony whereof I affix my signature in presence of two witnesses.

RICHARD L. NELSON.

Witnesses:
J. J. ROBINSON,
R. N. ROBINSON.